(12) United States Patent
Estelle (10) Patent No.: US 7,740,225 B1
(45) Date of Patent: Jun. 22, 2010

(54) SELF ADJUSTING SOLENOID DRIVER AND METHOD

(75) Inventor: Peter W. Estelle, Norcross, GA (US)

(73) Assignee: Nordson Corporation, Westlake, OH (US)

( * ) Notice: Subject to any disclaimer, the term of this patent is extended or adjusted under 35 U.S.C. 154(b) by 2077 days.

(21) Appl. No.: 09/702,493

(22) Filed: Oct. 31, 2000

(51) Int. Cl.
*F16K 31/02* (2006.01)

(52) U.S. Cl. .................. 251/129.05; 361/154; 361/187

(58) Field of Classification Search ............ 251/129.05; 361/154, 187
See application file for complete search history.

(56) References Cited

U.S. PATENT DOCUMENTS

| | | | | |
|---|---|---|---|---|
| 3,747,576 | A * | 7/1973 | Gordon et al. ............... | 123/492 |
| 4,214,290 | A * | 7/1980 | Sloan ........................... | 361/154 |
| 4,812,945 | A * | 3/1989 | D'Onofrio .................... | 361/154 |
| 4,878,147 | A * | 10/1989 | Oyama et al. ................ | 361/154 |
| 4,890,188 | A * | 12/1989 | Russell et al. ............ | 361/154 X |
| 4,898,361 | A * | 2/1990 | Bender et al. ......... | 251/129.05 X |
| 5,370,320 | A | 12/1994 | Sofer | |
| 5,645,097 | A * | 7/1997 | Zechmann et al. .. | 251/129.05 X |
| 5,737,172 | A * | 4/1998 | Ohtsuka .................. | 361/154 X |
| 5,748,431 | A * | 5/1998 | Goodnight et al. .......... | 361/154 |
| 5,812,355 | A * | 9/1998 | Nojima .................... | 361/154 X |
| 5,876,102 | A * | 3/1999 | Mori et al. ............. | 251/129.05 |
| 5,884,896 | A * | 3/1999 | Kono et al. ......... | 251/129.05 X |

FOREIGN PATENT DOCUMENTS

| EP | 0 092 365 | | 10/1983 |
|---|---|---|---|
| FR | 2635991 | * | 3/1990 |

OTHER PUBLICATIONS

Burr Brown Corp., *Application Notes, DRV102 PWM Solenoid/Valve Driver*, 1998.

* cited by examiner

*Primary Examiner*—John Rivell
*Assistant Examiner*—Andrew J Rost
(74) *Attorney, Agent, or Firm*—Wood, Herron & Evans, L.L.P.

(57) ABSTRACT

A fluid dispenser having a dispensing valve movable between open and closed positions for controlling the flow of the fluid from the fluid dispenser. A solenoid is operatively connected to the dispensing valve and is capable of moving the dispensing valve between the open and closed positions. The fluid dispenser further includes a power supply having a voltage and a driver circuit electrically connected to the solenoid and the power supply. The driver circuit provides an output signal to the solenoid having a time variable component, for example, a peak current duration, determined as a function of the voltage of the power supply. Thus, the driver circuit automatically adjusts to, and can be used with, power supplies of different voltages. The invention further includes a method by which the driver circuit provides the output signal as a function of the power supply voltage.

9 Claims, 4 Drawing Sheets

SELF ADJUSTING SOLENOID DRIVER AND METHOD

FIELD OF THE INVENTION

The present invention generally relates to an apparatus for dispensing fluids and more specifically, to an improved gun driver circuit of a fluid dispensing apparatus.

BACKGROUND OF THE INVENTION

Pneumatic and electric fluid dispensers have been developed for dispensing applications requiring a precise placement of a fluid. Pneumatic dispensers have a significant advantage in that the pneumatic solenoid operating the dispensing valve provides a sufficient force so that the dispensing valve operation is essentially independent of the viscosity of the fluid being dispensed. However, pneumatic solenoids have disadvantages in that they generally have a shorter life than electric solenoids, and the operation of the pneumatic solenoid is subject to less precise control than the electric solenoid in an electric fluid dispenser. Therefore, in some applications, electrically operated fluid dispensers are preferred over pneumatic fluid dispensers.

Generally, electrically operated fluid dispensers include an electromagnetic coil surrounding an armature that is energized to produce an electromagnetic field with respect to a magnetic pole. The electromagnetic field is selectively controlled to open and close a dispensing valve by moving a valve stem connected to the armature. More specifically, the forces of magnetic attraction between the armature and the magnetic pole move the armature and valve stem toward the pole, thereby opening the dispensing valve. At the end of a dispensing cycle, the electromagnet is de-energized, and a return spring returns the armature and valve stem to their original positions, thereby closing the dispensing valve.

In the operation of an electric fluid dispensing gun, the coupling between the coil and the armature is not efficient; and therefore, in order to achieve the highest actuation speed, a current pulse or spike is typically provided to the coil during an initial turn on period in order to initiate the motion of the armature as quickly as possible. After the initial current pulse, the current through the coil is then reduced to approximately the minimum value required to hold the armature in its open position against the opposing force of the return spring. Such a stepped current waveform provides high performance while minimizing power dissipation in the coil.

The continued development and use of fluid electric dispensers has resulted in more demanding performance specifications. For example, the operational speed of the dispensing valve can be increased by increasing the electrical voltage applied to the electric coil operating the valve. However, simply doubling the applied voltage without other changes to the solenoid driver circuit would cause overheating and possibly degrade the performance of the fluid dispenser. For example, if a high voltage power supply is used with a low voltage solenoid driver circuit, the solenoid will switch proportionally faster. However, the low voltage solenoid driver provides an initial current pulse having more power than is required by the solenoid which results in an inefficient operation of the coil. Therefore, if it is desired to use a higher voltage to operate the fluid dispenser at a higher rate, not only must a new power supply be used; but a different solenoid driver circuit must be used. The requirement of replacing the whole driver circuit to upgrade the performance of the fluid dispenser is labor intensive, time consuming and expensive.

While the above problem has been described with respect to an electrically operated fluid dispenser, a similar problem exists with respect to pneumatically operated fluid dispensers. Therefore, there is a need to provide a fluid dispenser having a driver circuit which is operable with different power supplies.

SUMMARY OF INVENTION

The present invention provides a fluid dispenser having an improved driver circuit providing a wide range of gun performance. The performance of the fluid dispenser of the present invention can be improved by simply replacing a lower voltage power supply with a higher voltage power supply. The fluid dispenser of the present invention has a driver circuit that automatically adjusts the drive current as a function of the higher voltage being used. Thus, the driver circuit of the present invention is especially advantageous in being able to easily, inexpensively and quickly upgrade the performance of both electric and pneumatic fluid dispensers.

In accordance with the principles of the present invention and the described embodiments, the invention in one embodiment provides an electrically operated fluid dispenser for dispensing a fluid onto a substrate. The fluid dispenser has a dispensing valve movable between an open position allowing a flow of the fluid from the fluid dispenser and a closed position preventing the flow of the fluid from the fluid dispenser. A solenoid is operatively connected to the dispensing valve and is capable of moving the dispensing valve between the open and closed positions. The fluid dispenser further includes a power supply and a driver circuit electrically connected to the solenoid and the power supply. The driver circuit provides an output signal to the solenoid having a time variable component determined by a voltage of the power supply.

In one aspect of the invention, the control circuit provides an initial peak current having a variable duration followed by a lower magnitude hold current. Further, the duration of the initial peak current is determined as a function of the voltage of the power supply. More specifically, the initial peak current has a duration that automatically changes as an inverse function of the voltage of the power supply.

The fluid dispenser of the present invention thus automatically adjusts the duration of the output signal being supplied to the solenoid as a function of the voltage of the power supply being used. Hence, the fluid dispenser of the present invention has the advantage of being able to quickly and inexpensively upgrade the gun performance by simply substituting a higher voltage power supply for a lower voltage power supply.

In another embodiment, the invention provides a pneumatically operated fluid dispenser for dispensing a fluid onto a substrate having a dispensing valve movable between open and closed positions for controlling a flow of the fluid from the fluid dispenser. A piston assembly is operatively connected to the dispensing valve and is capable of moving said dispensing valve between the open and closed positions. A solenoid valve is fluidly connected between a source of pressurized air and the piston assembly, and a driver circuit is connected to the solenoid valve and a power supply and provides an output signal to the solenoid valve having a time variable component determined by said voltage of said power supply.

In a further embodiment of the invention, a method is provided for operating a fluid dispenser that is controllable to dispense a fluid onto a substrate. The fluid dispenser has a dispensing valve movable between open and closed positions for controlling a flow of the fluid from the fluid dispenser. The fluid dispenser further has a solenoid with a coil in electromagnetic communication with an armature being movable through a displacement by energizing the coil. The operation of the solenoid is effective to cause the dispensing valve to move between the open and closed positions. The method comprises providing a power supply having a voltage and producing an output drive signal having a time variable component determined as a function of the voltage of the power supply. That output signal is applied to the coil of the solenoid, thereby automatically changing the operation of the dispensing valve as a function of the voltage of the power supply.

Various additional advantages, objects and features of the invention will become more readily apparent to those of ordinary skill in the art upon consideration of the following detailed description of embodiments taken in conjunction with the accompanying drawings.

DETAILED DESCRIPTION OF THE INVENTION

Figures 1, 2, 2A:
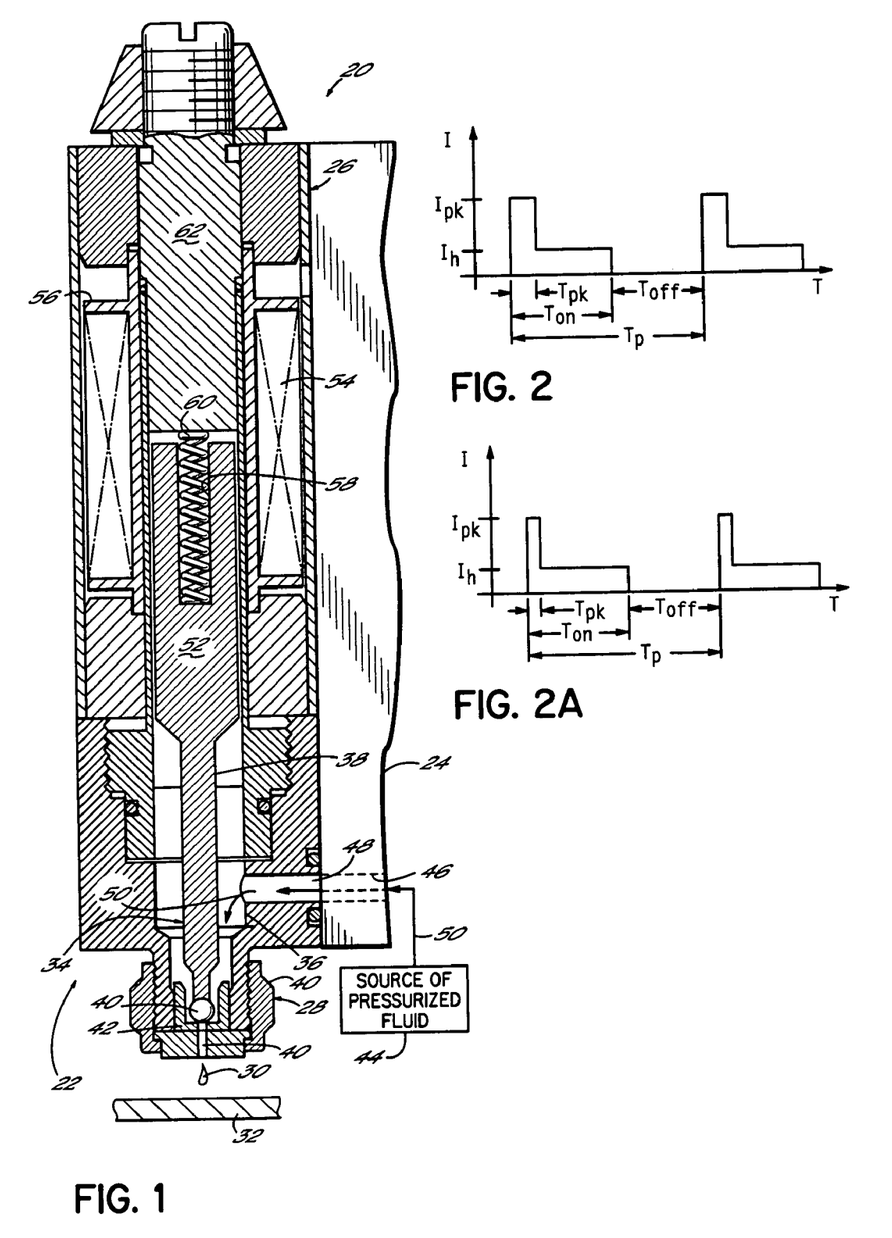
FIG. 1 is an axial cross-sectional view of an electric fluid dispenser that may be used with the driver circuit of FIG. 3.
FIG. 2 is a schematic diagram of a current waveform provided by the driver circuit of FIG. 3.
FIG. 2A is a schematic diagram of another current waveform provided by the driver circuit of FIG. 3.

Referring to FIG. 1, an electrically operated fluid dispenser or dispensing gun 20 comprises one or more dispensing modules or valves 22 mounted on a fluid distribution manifold plate 24 in a known manner. The dispensing valve 22 includes a dispenser body 26 and a fluid dispensing nozzle body 28. The dispenser 20 normally used to dispense high viscosity fluids, for example, a hot melt adhesive, solder flux, thermal grease, etc., but low viscosity fluids can benefit from the invention as well. Furthermore, the dispenser 20 is mounted in a dispensing machine or system (not shown) in a known manner to dispense fluids in discrete amounts, for example, as droplets or dots, but alternatively in continuous beads. As shown in FIG. 1, the dispenser body 26 used in conjunction with the fluid dispensing nozzle body 28 is particularly constructed to dispense fluid 30 onto a substrate 32. Relative motion between the substrate 32 and dispenser 20 is provided in a known manner.

A valve stem 34 is mounted in an interior portion 36 of the dispenser body 26, and the valve stem includes a shaft 38 through the interior portion 36. A ball 40 is mounted to a lower end of the shaft 38 which is shown in FIG. 1 in sealing engagement with a valve seat 42 positioned in the nozzle body 28. Thus, the valve stem 34 and ball reciprocate between open and closed positions with respect to the valve seat 42, thereby operating as a dispensing valve 22. When the valve stem 34 is in the open position, fluid is received from a fluid source 44, through a fluid passage 46 in the manifold 24 and through an inlet passageway 48. The source 44 of hot melt adhesive is normally pressurized. Arrows 50 indicate the flow path of the fluid. An armature 52 is disposed within the interior portion 36 and is coaxially aligned with and, preferably, formed integrally with shaft 38. An electromagnetic coil 54 is disposed about the armature 52. The coil 54 is contained in a housing 56 and connected to a power source (not shown). When supplied with electrical current, the coil 54 generates an electromagnetic field which actuates the valve stem 34 to an open position as will be described below.

A bore 58 extends into the armature 52 to house a return spring 60. The return spring 60 biases the valve stem 34 and, more specifically, the ball 40, to sealingly engage the valve seat 42 in a closed position. The return spring 60 is normally a compression spring which is placed under compression within the bore 58 through engagement with an electromagnetic pole 62. To achieve an open position, the electromagnetic coil 54 must generate a sufficient electromagnetic field between the armature 52 and the pole 62 so as to attract the armature 52 and the pole 62 together. Since the pole 62 cannot move, the armature 52 will move against the force of the spring 60 until it hits the pole 62. Such a dispenser 20 is further described in commonly assigned, U.S. Pat. No. 5,875,922, entitled APPARATUS FOR DISPENSING AN ADHESIVE, issued on Mar. 2, 1999, which is hereby incorporated by reference herein in its entirety.

As previously discussed, electric guns are preferred because of the precision with which they may be controlled during a fluid dispensing operation. Further, known electric fluid dispensers apply a stepped current waveform to the coil that has an initial spike and then steps down to a magnitude sufficient to hold the valve stem 38 in its open position by overcoming the opposing force of the return spring 60. Such a current waveform signal is schematically illustrated in FIG. 2. To turn the gun on, thereby opening the dispensing valve 22, an initial current magnitude $I_{pk}$ is applied for a duration or period of time $T_{pk}$ in response to a trigger pulse. Thereafter, the current is reduced to a lesser hold level $I_h$ for the remaining period of the on time $T_{on}$. A lesser current value is then maintained for an off time $T_{off}$ during the remaining time of the current waveform period $T_p$. During the off time, the current value may be substantially zero or some other value insufficient to open the dispensing valve 22.

As will be appreciated, the waveform illustrated in FIG. 2 is for purposes of discussion and the real waveform consists of exponential functions that transition the current between levels. The real time, on time wave shape can look radically different from the idealized waveform of FIG. 2, depending on many factors such as $I_{pk}$, $I_h$, $T_{pk}$, $T_{on}$, $T_p$, $L_{coil}$, $R_{coil}$, etc. The $T_{on}$ and $T_p$ are related to the adhesive pattern required for a particular product. The inductance and resistance of the coil are a function of the gun itself, and the $I_{pk}$ is normally bounded by various considerations of the fluid dispenser 20 such as magnetic saturation, thermal considerations or force requirements.

Initial values of magnitudes of the peak and hold currents are based on the coil specifications, however, the peak current magnitude $I_{pk}$, the magnitude of the hold current $I_h$ and the duration of the peak current $T_{pk}$ are often adjustable by the user. The user may adjust the current waveform and the dispensing line rate in order to tune the dispensing operation to its peak performance.

Figure 3:
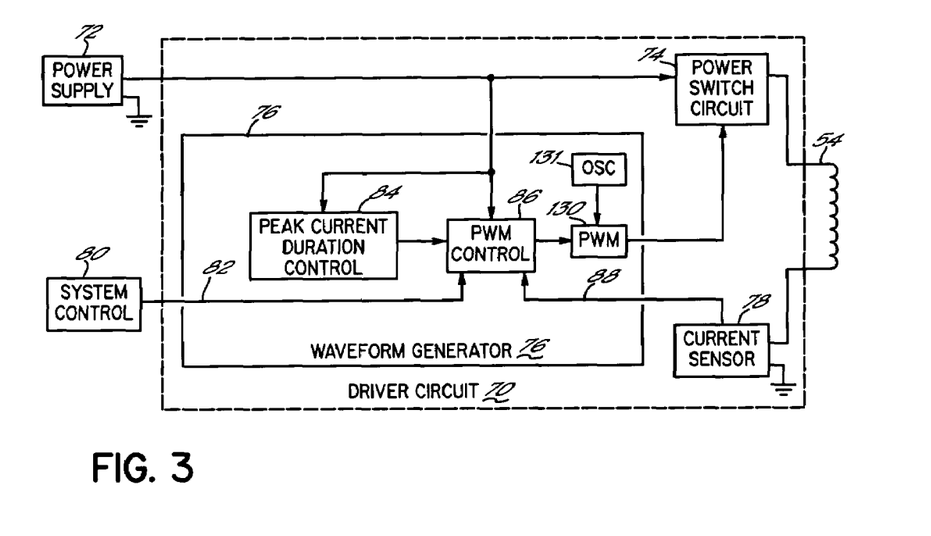
FIG. 3 is a schematic block diagram of a driver circuit that may be used to operate the fluid dispensers illustrated in FIGS. 1 and 6 in accordance with the principles of the present invention.

Referring to FIG. 3, the coil 54 is connected to a controller or solenoid driver circuit 70 functioning as a solenoid or valve driver that includes a power switch circuit 74, a control circuit or waveform generator 76 and a current sensor 78. The current sensor 78 provides a current feedback signal representing current in the coil 54, and the current feedback signal is provided to the waveform generator 76. The waveform generator 76 provides a drive signal to the power switch 74. A power supply 72 provides an output connected to the power switch 74 and the waveform generator 76. The power supply 72 is normally a regulated power supply having a nominal output voltage, for example, 24 volts DC ("VDC"), or 48 VDC, etc.; however, in some applications, the power supply 72 may be unregulated. The current sensor 78 can be implemented with any one of many current measuring devices and methods, for example, a simple resistor, a Hall effect device, a current transformer, etc. The driver circuit 70 is further connected to a machine or system control 80 and provides output signals to the coil 54. The system control 80 includes all of the other known dispensing system or machine controls necessary for the operation of the dispensing system, for example, a pattern control for providing a trigger signal. The system control 80 also includes input devices such as a keypad, pushbuttons, etc. and output devices such as a display, indicator lights, etc. that provide communication links with a user in a known manner. The waveform generator 76 can be implemented using analog or digital circuit components.

The fluid dispenser 20 (FIG. 1) is operated in response to a trigger pulse supplied on an output 82 from the system control 80. With each trigger pulse, a waveform signal, as illustrated in FIG. 2, is provided by the waveform generator 76. The waveform signal, for example, a current waveform, determines the waveform of an output signal from the power switch 74. The values of $I_p$, and $T_{pk}$ are generally chosen as a function of the application requirements, for example, the viscosity of the fluid being dispensed. Further, the value of the hold current $I_h$ is set to a nominal value equal to the minimum current required to hold the valve in the open position, that is, the minimum value of current to overcome the biasing force of the compressed spring 60 (FIG. 1).

The current waveform drives the power switch 74 to provide the desired current or power from the power supply 72 to the coil 54. The power switch 74 operates to provide a desired drive current signal to the coil 54 but with a current waveform having a general shape corresponding to the shape determined by the waveform generator 76.

In some applications, a 24 VDC power supply may be suitable; and assume that a 24 VDC power supply provides the current waveform of FIG. 2. However, a change in application related variables, for example, an increase in the speed of the production line, may make it desirable to increase the speed of operation of the electric fluid dispenser. The speed of operation of the electric fluid dispenser can be increased by increasing the voltage applied to the coil of the dispenser to, for example, 48 VDC. If a 24 VDC power supply is replaced by a 48 VDC power supply, the coil will operate at a faster rate; however, for the most efficient operation, the duration of the peak current as illustrated in FIG. 2 should be correspondingly changed. Therefore, to provide a waveform that conforms to the requirements of the high voltage power supply, a new driver circuit must be used that has a waveform generator providing a waveform that matches the requirements of the 48 VDC power supply as shown in FIG. 2A. Therefore, improving the performance of the electric fluid dispenser by using a higher voltage power supply and a compatible driver circuit is very costly.

To reduce the cost of using a different power supply with the electric fluid dispenser, the present invention utilizes a driver circuit 70 that accommodates a wide range of power supply voltages, for example, from approximately 23 VDC to approximately 55 VDC. The output voltage from the power supply 72 is provided to a peak current duration control 84 which modifies the duration of the peak current $T_{pk}$ as a function of the magnitude of the output voltage of the power supply 72. The peak current duration control 84 provides an output to a pulse width modulator ("PWM") control 86 that, in turn, controls the operation of a PWM 130. Thus, if different power supplies 72 having different supply voltages are connected to the driver circuit 70, the waveform generator 76 automatically adjusts the duration of the peak current $T_{pk}$ so that the same driver circuit 70 can be efficiently used with different power supplies 72.

Figure 4:
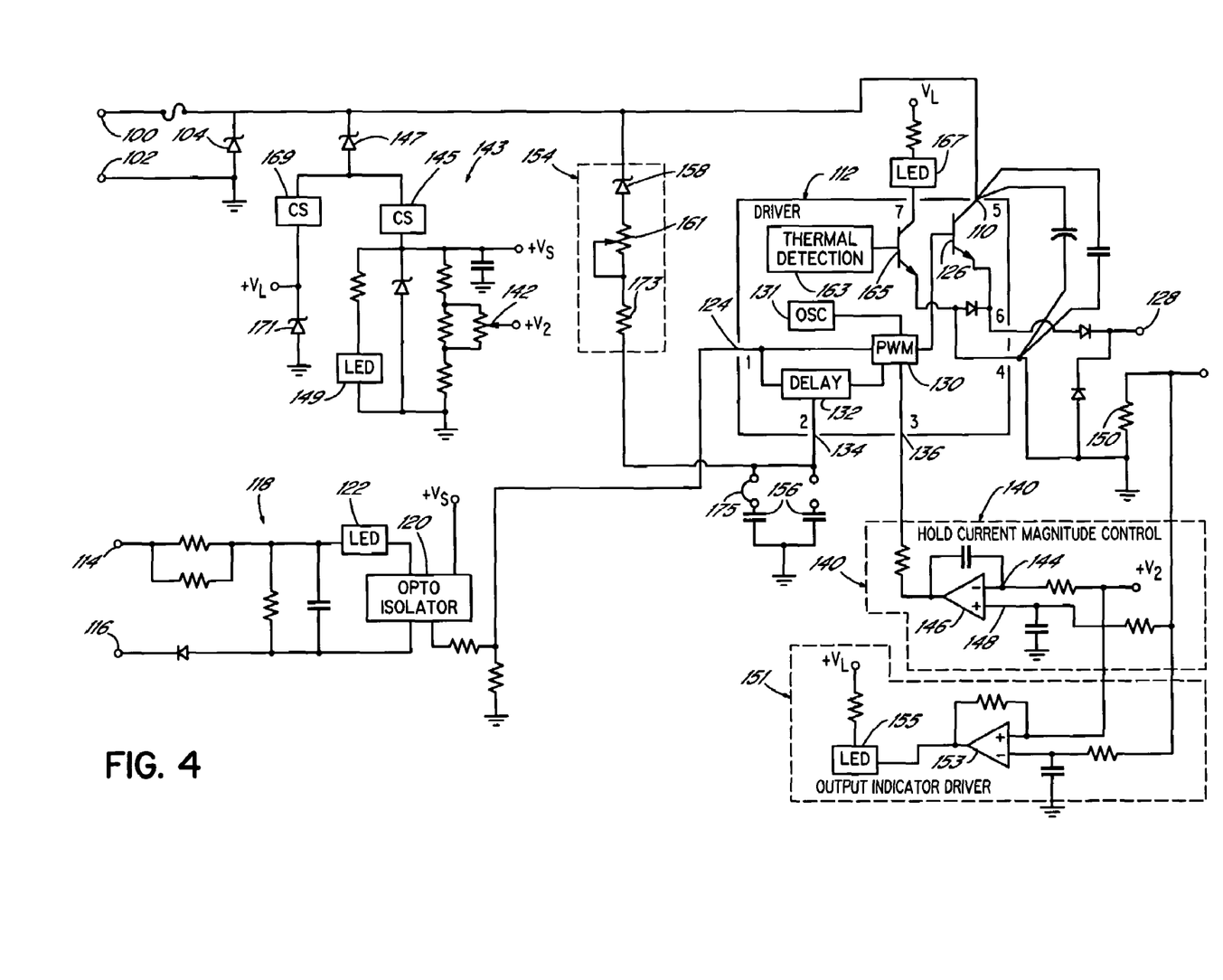
FIG. 4 is a detailed schematic diagram of one embodiment of the driver circuit that may be used to operate the fluid dispensers of FIGS. 1 and 6.

One embodiment of such a driver circuit 70 is shown in detail in FIG. 4. Outputs of a power supply, for example, power supply 72 of FIG. 3, are connected to the inputs 100, 102 of the circuit of FIG. 4. A zener diode 104 is used to provide transient and reverse polarity protection. Power from terminal 102 is then provided to a power supply input 110 of a pulsewidth modulated driver 112. The driver is a high-side power switch employing a pulsewidth modulated output. One such driver is commercially available as Part No. DRV102 from Burr-Brown Corporation of Tucson, Ariz.

Inputs 114, 116 receive a trigger signal from the system control 80 (FIG. 3) when it is desired to activate the fluid dispenser. The trigger pulse first passes through an input isolation interface 118 having an opto-isolator 120. The trigger pulse illuminates an LED 122 for the duration of the trigger pulse. An input 124 of the driver 112 receives the trigger pulse from the opto-isolator 120. The driver 112 provides a number of functions that are represented by a schematic block diagram of components illustrated therein. The driver 112 includes a power switch 126 that is operated directly by a PWM 130 being driven by pulses from an oscillator 131. Thus, in the embodiment of FIG. 4, a summing junction 79 (FIG. 3) is not used. The power switch 126 provides an output signal on output terminal 128 that is connected to one end of the coil 54 (FIG. 3). The PWM 130 is switched on and off by a signal on the input 124; and as will be described, the duty cycle of the PWM 130 is controlled by a delay circuit 132 as well as a signal on an input 136.

The leading edge of the trigger pulse on the input 124 initiates the operation of the PWM 130 at a higher, for example, 100%, duty cycle that, in turn, changes the state of the power switch 126 and produces a leading edge of a pulse on an output 128. The leading edge of the pulse on the output 128 has a peak current magnitude $I_{pk}$ (FIG. 2) determined by the power supply voltage, for example, 24 VDC, the coil inductance and the operation of the power switch 126. The delay circuit 132 within the driver 112 controls the duration of the of the peak current $T_{pk}$ (FIG. 2), in this example, the 100% PWM duty cycle, before switching the operation of the PWM 130 to a lower duty cycle operation. Further, as will subsequently be described, the PWM operation controlling the duration of the peak current $T_{pk}$ is varied using the signal on an input 134 of the driver 112.

At the end of the peak current $T_{pk}$, the delay circuit 132 switches the PWM 130 to a lower duty cycle operation, and the magnitude of the lower duty cycle operation is determined by the signal on the input 136 of the driver 112. Further, the lower duty cycle operation of the PWM 130 provides a lower current magnitude on the output 128 of the driver 112 representative of the hold current magnitude $I_h$ of FIG. 2. The duty cycle of the PWM on the input 136 is determined by a closed loop, hold current magnitude control 140 having an amplifier 146. A first input 144 of the amplifier 146 is a voltage level provided by an adjustable potentiometer 142 and represents the desired value of the hold current for the PWM 130, that is, a desired hold current magnitude $I_h$ on the output 128 of the driver 112. The potentiometer 142 is part of a power supply circuit 143 that includes a first current regulator diode 145 connected to the power supply input 100 through the zener diode 147. The current regulator diode 145 also provides power to a power-on LED 149 that illuminates when power is being supplied on the input 100.

A second input 148 of the amplifier 146 receives a current feedback signal from a current sensing resistor 150 that is measuring the hold current $I_h$ being supplied by the driver circuit 112 on the output 128. The current feedback signal is also supplied to an output indicator driver 151. The current feedback signal drives a comparator 153 that illuminates a gun-on LED 155 in response to the current feedback signal having a desired minimal value.

The amplifier 146 provides an error signal to the input 136 of the driver 112 that represents the difference between the desired hold current value on the input 144 and a feedback current signal on the input 148 representing the hold current being supplied by the driver to the coil 54 (FIG. 3) as measured by the current sensing resistor 150. Thus, the error signal on the input 136 functions to operate the PWM 130 at a duty cycle that maintains the measured hold current on the input 148 substantially equal to the desired hold current on the input 144.

The hold current magnitude $I_h$ is maintained until the end of the trigger pulse, that is, until the trailing edge of the trigger pulse on inputs 114, 116 switches the PWM 130 off, thereby causing the switch 126 within the driver 112 to switch and terminate the signal on the output 128. The signal on the output 128 of the driver is then reduced to a zero magnitude current and voltage.

The operation of the PWM 130 which determines the duration of the peak current $T_{pk}$ is controlled by the delay circuit 132, the capacitors 156 and a voltage dependent current injector or source 154. The delay circuit 132 within the driver 112 provides a delay that is controlled by a circuit including the capacitors 156. The delay circuit 132 operates as a current regulator and supplies current to the capacitors 156. As the capacitors charge, a capacitor voltage is detected by the delay circuit 132. When the capacitor voltage reaches a threshold level, as detected by the delay circuit 132, the delay circuit 132 switches the PWM 130 from its higher duty cycle operation to a reduced duty cycle operation determined by the hold current magnitude control 140.

Thus, in order to vary the duration of the peak current $T_{pk}$, the operation of the PWM 130 is varied by changing the magnitude of the current supplied to the capacitors 156. The change in the time required for the capacitors 156 to charge to the threshold voltage level is related as an inverse function to the current. In other words, with a smaller current charging the capacitors 156, the duration of the peak current $T_{pk}$ is longer; and with more current charging the capacitors, the duration of the peak current $T_{pk}$ is shorter. The voltage of the zener diode 158 is chosen to be either equal to, or slightly above, the lowest intended supply voltage. Thus, normally, the current injector 154 is inoperative with a lower voltage power supply. For example, with a 24 VDC power supply and the series resistors 161, 173, a 24 volt zener diode 158 is relatively nonconducting; and only the current provided by the delay circuit 132 flows to the capacitors 156. However, with a higher voltage power supply, the zener diode conducts, thereby supplying more current to the capacitors 156 and reducing the duration of the peak current $T_{pk}$ of the PWM 130. The current flow from the injector 154 is determined by the power supply voltage, the voltage of zener 158, the potentiometer 161 and the series resistor 173.

The driver 112 also includes a thermal detection circuit 163 and a shutdown switch 165. The thermal detection circuit detects an over-temperature, over-current or under-current condition within the driver 112. In the event of the detection of a fault condition, the detection circuit 163 causes the shutdown switch 165 to switch states and illuminate an LED 167 indicating the error condition. The LED 167 is powered by +VL derived from power supply 143 and consists of a current regulator diode 169 and a zener diode 171. The current regulator diodes 145 and 169 may be implemented with different components. For example, in the illustrated embodiment, the current regulator diodes 145, 169 are commercially available as part no. SST511 from Vishay/Siliconix, which is owned by Vishay Intertechnology, Inc. of Malvern, Pa. 19355.

In use, with a 24 VDC power supply, the circuit of FIG. 4, with the driver 112, operates as described above and provides a current waveform as illustrated in FIG. 2. If for some reason, it is desirable to use a larger power supply, for example, a 48 VDC power supply, the circuit of FIG. 4 may be used without any change whatsoever. For example, it may be desirable to increase the precision of the dispensing process by increasing or speeding up the response time of the electric fluid dispenser. The response time of the dispenser can be increased by utilizing a higher voltage to drive the coil 54 (FIG. 1) within the fluid dispenser 20. With the present invention, the 24 VDC power supply 72 is replaced with the higher 48 VDC power supply, and the terminals of the new power supply are connected to the inputs 100, 102 of the circuit of FIG. 4. The circuit operates identically as previously described with one exception. The 24 volt zener diode 158 within the voltage dependent current injector 154 breaks down and conducts additional current in the presence of the 48 VDC power, thereby providing additional charging current to the capacitors 156. The increased current flow charges the capacitors 156 more quickly to the threshold voltage being detected by the delay circuit 132. And, the delay circuit 132 operates to switch the PWM 130 out of the initial peak current $T_{pk}$ more quickly, thereby reducing the duration of the peak current $T_{pk}$ as shown in FIG. 2A.

The peak current duration control 84 of FIG. 3 is implemented with the modulated current source 154 and the capacitors 156, and the PWM control 86 of FIG. 3 is implemented using the delay circuit 132, the capacitors 156 and the hold current magnitude control 144. Known delay circuits 132 include a current source, threshold comparator and capacitor reset and function to provide a constant current to the capacitors 156. It should be noted that a plurality of capacitors 156 can be used, and different capacitance values selected using one or more jumpers 175. The modulated current source 154 comprised of zener diode 158, potentiometer 161 and resistor 173 is responsive to the output voltage magnitude of the power supply 72 (FIG. 3) connected to the inputs 100, 102. The modulated current is summed with the constant current from the delay circuit 132 in charging the capacitors 156; and thus, the modulated current controls the time at which the delay circuit reaches its threshold to switch from a higher duty cycle peak current to a lower duty cycle.

With a lower voltage power supply, a smaller modulated current is supplied; and it takes longer for the capacitors 156 to charge to the threshold value, thereby providing a longer duration of the peak current. With a higher voltage power supply, a larger current is summed with the constant current from the delay circuit 132; and the capacitors 156 charge more quickly, thereby providing a shorter duration of the peak current. Thus, with the higher voltage power supply, the duration of the peak current is automatically shortened. By shortening the duration of the peak current to match the response time of the dispensing valve, no more current than is required is provided to the coil and therefore, no more heat than necessary is generated by the coil.

Figure 5:
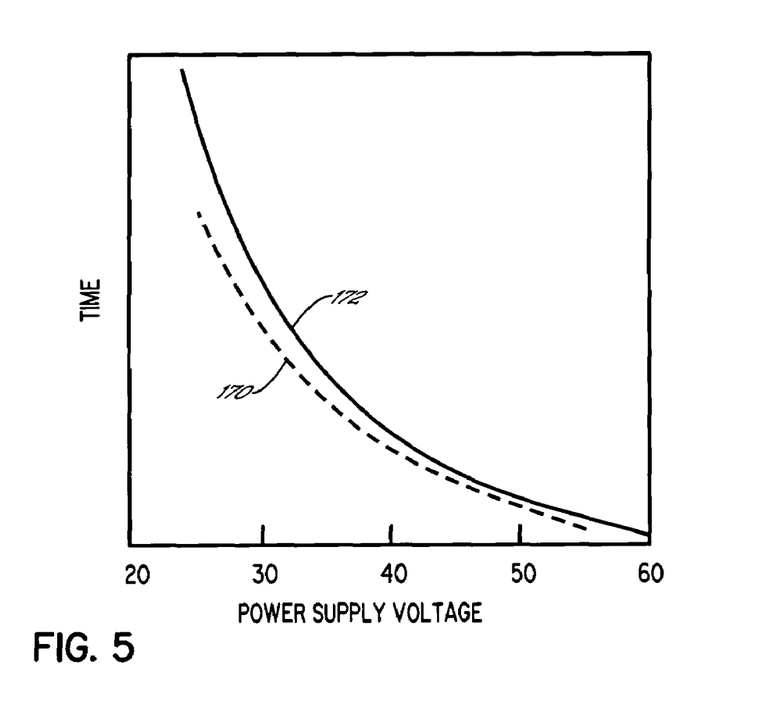
FIG. 5 is curves illustrating a comparison of the performance of the driver circuit of FIG. 4 with the performance of the coils used in the operation of the fluid dispensers of FIGS. 1 and 6.

The present invention has a further advantage as indicated in FIG. 5. The curve 170 represents the time response of the electromagnetic and mechanical components of the fluid dispenser as a function of different power supply magnitudes. The nonlinearity of the curve 170 is principally caused by the inductance of the coil 54 (FIG. 3). The curve 170 suggests that the time required to open the electric fluid dispenser reduces nonlinearly as the power supply voltage to the coil increases. The curve 172 represents the change in width, or duration of, the peak current $T_{pk}$ at the output 128 of the driver 112 as a function of increases in the power supply voltage applied to the pin 110 of the driver. The curves 170, 172 represent the high degree of efficiency that the present invention has in matching the duration of the peak current with the nonlinear response of the dispensing valve as the power supply voltage changes. While the curves 170, 172 of FIG. 5 are of a similar shape, they are not coincident. As will be appreciated, by adjusting the values of components within the circuit of FIG. 4, the curve 172 can be made to more closely coincide with the curve 170, thereby further optimizing the operation of the circuit of FIG. 4. However, as will be appreciated, the manufacturing tolerances of such circuit components will result in the curves 170, 172 being shifted slightly with respect to each other, however, the general shape of the two curves 170, 172 will almost always be similar.

The curves 170, 172 of FIG. 5 also illustrate that the benefits of the present invention as embodied in the circuit of FIG. 4 are available for any power supply voltage that is within the design limits of the circuit of FIG. 4, for example, in the range of approximately 23 VDC to approximately 55 VDC. Thus, for any power supply in that range, the circuit of FIG. 4 will automatically adjust the duration of the peak current pulse in a manner inversely proportional to the change in magnitude of the voltage of the power supply installed. Thus, the circuit of FIG. 4 automatically shortens the duration of the peak current $T_{pk}$ in response to higher voltage power supply and automatically lengthens the duration of the peak current $T_{pk}$ in response to a lower voltage power supply being used. The automatic nature of the adjustment of FIG. 4 is a function of the similar shapes of the curves 170, 172. In the absence of the similar shapes of the curves 170, 172, the circuit of FIG. 4 would most probably require a user adjustment when a different voltage power supply is used.

The ability to easily adjust the duration of the peak current in a manner that closely follows the nonlinearity of an inductance, for example, coil 54 (FIG. 3) provides other advantages. First, the circuit of FIG. 4 can be easily tuned to match guns having different coils. By adjusting the potentiometer 161, the resistor 173 and the capacitors 156, the curve 172 of FIG. 5 can be moved in the time domain, that is, vertically, to match different coils that may be encountered on different dispensing guns.

The driver circuit for the fluid dispenser of the present invention automatically adjusts the duration of the peak current as a function of the voltage of the power supply being used. Hence, the dispensing gun of the present invention has the advantage of being able to quickly and inexpensively upgrade the gun performance by simply substituting a lower voltage power supply with a higher voltage power supply.

While the present invention has been illustrated by a description of various embodiments and while these embodiments have been described in considerable detail in order to describe a mode of practicing the invention, it is not the intention of Applicant to restrict or in any way limit the scope of the appended claims to such detail. Additional advantages and modifications within the spirit and scope of the invention will readily appear to those skilled in the art. For example, FIG. 4 is only one example of how the present invention may be implemented. As will be appreciated, depending on the design and application parameters, the invention may be implemented using analog, digital or a combination of digital and analog circuit components in any configuration that automatically adjusts the duration of the peak current $T_{pk}$ as a function of the output voltage from the power supply 72.

Further, as discussed herein, the speed of operation and heat are of particular concern with respect to electrically operated dispensing guns; and the invention described herein is particularly applicable thereto. However, it should be noted that the invention is also applicable to pneumatically operated dispensers in which an electrically operated pneumatic solenoid is effective to cause a dispensing valve to be operated by a pneumatic piston.

Figure 6:
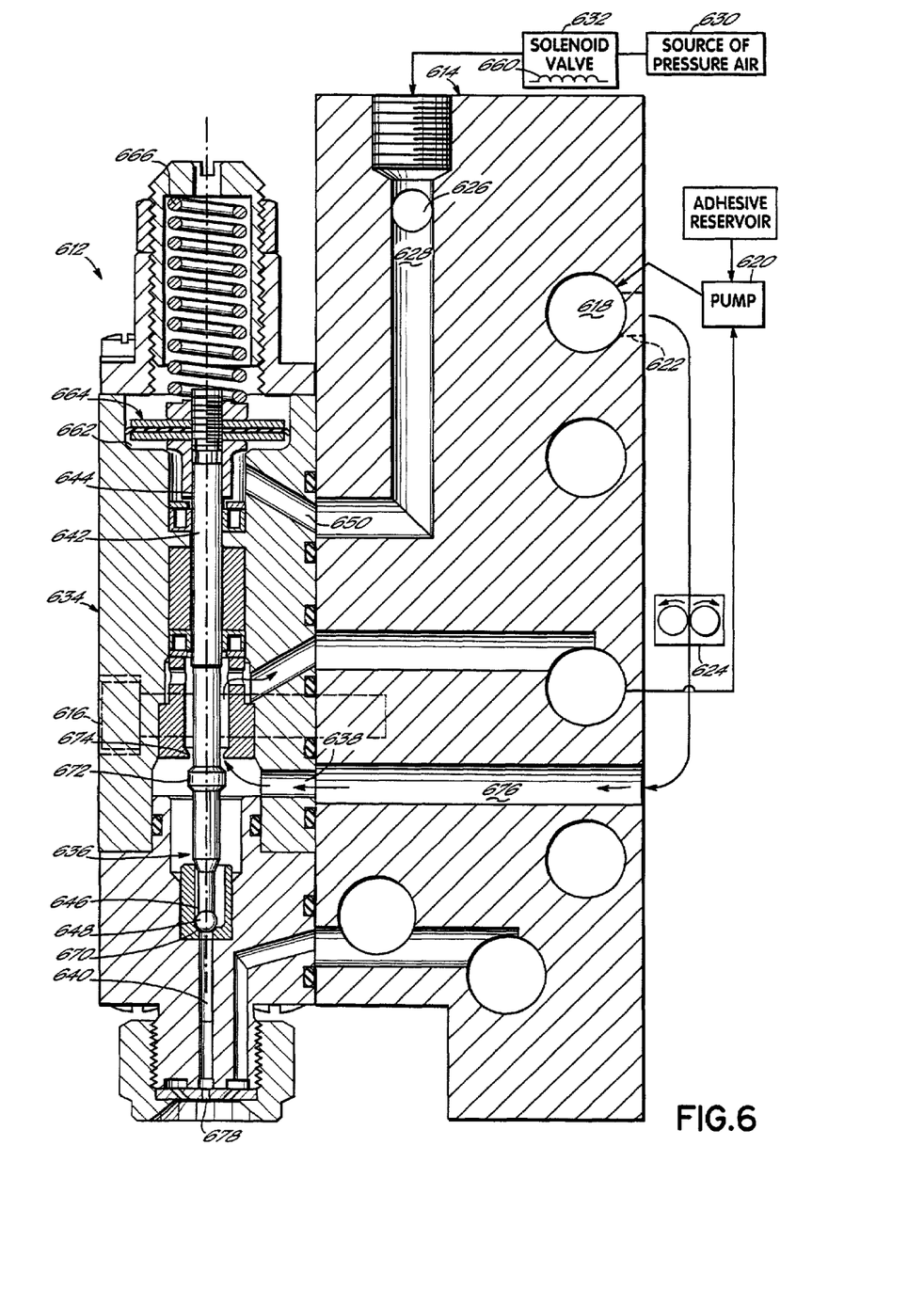
FIG. 6 is an axial cross-sectional view of a pneumatically operated fluid dispenser that may be used with the driver circuit of FIG. 3.

Referring first to FIG. 6, a liquid dispensing module or gun 612 is mounted to a liquid and air distribution manifold 614 by fasteners 616. For clarity, air and liquid distribution blocks have been eliminated from this figure. The manifold 614 includes a main liquid supply passage 618 communicating with an outlet of a pump 620 and a distribution passage 622. The distribution passage 622 leads into gear pump 624, as schematically shown, and an outlet of the gear pump 624 communicates with a module supply passage 618 in the manifold 614. The manifold 614 includes a main air supply passage 626 connected with a distribution passage 628. The air supply passage 626 is connected to a pressurized air source 630 through an electrically operated solenoid 632. The dispensing module 612 generally includes a module body 634 including a main passage 636, a liquid inlet 638 and a liquid outlet 640. A valve stem 642 is mounted for reciprocating movement and includes an upper end 644 and a lower end 646 terminating with a ball-shaped or rounded valve member 648. It will be appreciated that this valve member may take on many forms, including more tapered or needle-like forms.

In operation, an output waveform on the output 128 of FIG. 4 is provided to a coil 660 of the solenoid valve 632. Energizing the coil 660 causes the solenoid valve 632 to open, thereby porting pressurized air from the source 630 through passages 626, 628. The pressurized air enters the air chamber 662 and moves the piston assembly 664 upward, as viewed in FIG. 6, against the force of a spring 666. Lifting the piston assembly 664 raises first valve member 648 from a first valve seat 670 and engages a second valve member 672 with a second valve seat 674. Thus, the liquid adhesive being supplied to supply passage 676 by the gear pump 624 can no longer travel past the second valve member 672 and second valve seat 674. Instead, the liquid adhesive travels past the first valve member 648 and first valve seat 670 into the liquid outlet 640 and exits the dispenser module 612 at a liquid discharge outlet or orifice 678. The signal on the output 128 of FIG. 4 has a peak and hold waveform as previously described. At the end of the on-time or hold portion of the waveform, the coil 660 is deenergized; and the solenoid valve 632 is closed, thereby discontinuing the supply of pressurized air to the module 612. When the solenoid valve 632 closes, pressurized air in the passage 626 is ported to atmosphere; and the return spring 666 moves the piston assembly 664 and valve stem 642 downward. The ball 648 is pushed against the seat 670, thereby terminating the flow of adhesive from the outlet 678.

The coil 660 of the solenoid 632 has substantially the same operating characteristic as the curve 170 of FIG. 5. Therefore, the embodiments of FIGS. 3 and 4 can be used to drive the coil 660 of the solenoid 632; and the duration of the peak current will change in the manner as previously described when power supplies of different voltages are used.

Therefore, the invention in its broadest aspects is not limited to the specific detail shown and described. Consequently, departures may be made from the details described herein without departing from the spirit and scope of the claims which follow.

What is claimed is:

1. A fluid dispenser for dispensing a fluid onto a substrate comprising:
   a dispensing valve movable between open and closed positions for controlling a flow of the fluid from said fluid dispenser;
   a solenoid, the operation of said solenoid being effective to cause said dispensing valve to move between the open and closed positions;
   a power supply having an output voltage; and
   a driver circuit electrically connected to said solenoid and said power supply and providing an output signal to said solenoid having an initial peak current with a variable duration followed by a hold current, the duration of said initial peak current varying as a function of the output voltage of said power supply.

2. The fluid dispenser of claim 1 wherein said driver circuit automatically varies the duration of said initial peak current as a function of the output voltage of said power supply.

3. The fluid dispenser of claim 2 wherein said driver circuit automatically varies the duration of said initial peak current as an inverse function of a magnitude of the output voltage of said power supply.

4. The fluid dispenser of claim 1 wherein the driver circuit further comprises a peak current duration control connected to said power supply and providing a signal varying as an inverse function of the output voltage of said power supply.

5. A method of operating a fluid dispenser for dispensing a fluid onto a substrate, the fluid dispenser having a dispensing valve being movable between open and closed positions for controlling a flow of the fluid from the fluid dispenser, a solenoid having a coil in electromagnetic communication with an armature being movable through a displacement by energizing the coil, the operation of the solenoid being effective to cause the dispensing valve to move between the open and closed positions; the method comprising:
   providing a power supply having a voltage;
   producing an output signal having an initial peak current with a variable duration followed by a hold current, the duration of the initial peak current varying as a function of the voltage of the power supply; and
   applying the output signal to the coil of the solenoid, thereby automatically changing the operation of the dispensing valve as a function of the voltage of the power supply.

6. A method of operating an electrically operated fluid dispenser for dispensing a fluid onto a substrate, the fluid dispenser having a dispensing valve operatively connected to an electrically operated solenoid, the dispensing valve being movable between open and closed positions for controlling a flow of the fluid from the fluid dispenser, the method comprising:
   providing a power supply having a voltage;
   producing an output signal having an initial peak current with a variable duration followed by a hold current, the duration of the initial peak current varying as a function of the voltage of the power supply; and
   applying the output signal to the electrically operated solenoid, thereby automatically changing the operation of the dispensing valve as a function of the voltage of the power supply.

7. The method of claim 6 further comprising varying the variable duration of the initial peak current of the output signal as an inverse function of the voltage of the power supply.

8. The method of claim 6 further comprising:
   producing a feedback signal representing current in the solenoid; and
   producing the hold current as a function of the feedback signal.

9. A method of operating an electrically operated fluid dispenser for dispensing a fluid onto a substrate, the fluid dispenser having a dispensing valve operatively connected to an electrically operated solenoid, the dispensing valve being movable between open and closed positions for controlling a flow of the fluid from the fluid dispenser, the method comprising:
   producing a first output signal having an initial peak current with a variable duration followed by a hold current, the duration of the initial peak current varying as a function of a first nominal voltage of a first power supply connectable to the fluid dispenser;
   applying the first output signal to the solenoid;
   producing a second output signal having an initial peak current with a variable duration followed by a hold current, the duration of the initial peak current varying as a function of a second nominal voltage of a second power supply connectable to the fluid dispenser in place of the first power supply; and
   applying the second output signal to the solenoid.

* * * * *